United States Patent
Bär et al.

(10) Patent No.: US 6,467,915 B2
(45) Date of Patent: Oct. 22, 2002

(54) DEFORMABLE MIRROR, IN PARTICULAR FOR A LASER BEAM MATERIAL MACHINING APPARATUS

(75) Inventors: Klaus Bär, Lauf; Brigitte Freisleben, Nürnberg; Reinhard Schmiedl, Weissenburg, all of (DE)

(73) Assignee: Diehl Munitionssysteme GmbH & Co. KG, Röthenbach (DE)

( * ) Notice: Subject to any disclaimer, the term of this patent is extended or adjusted under 35 U.S.C. 154(b) by 0 days.

(21) Appl. No.: 09/752,378

(22) Filed: Dec. 28, 2000

(65) Prior Publication Data

US 2001/0008469 A1 Jul. 19, 2001

(30) Foreign Application Priority Data

Jan. 19, 2000 (DE) .......................... 100 01 900

(51) Int. Cl.$^7$ ............................. G02B 5/10; G02B 7/185
(52) U.S. Cl. .................. 359/845; 359/846; 359/847
(58) Field of Search ................. 359/846, 847, 359/845, 848, 223, 224, 290, 291, 838; 372/107; 219/121.74

(56) References Cited

U.S. PATENT DOCUMENTS

| | | | | |
|---|---|---|---|---|
| 4,059,346 A | * | 11/1977 | Levine et al. | 359/847 |
| 4,119,366 A | * | 10/1978 | Lamaitre | 359/847 |
| 4,892,991 A | * | 1/1990 | Stadler et al. | 219/121.74 |
| 5,020,895 A | * | 6/1991 | Giesen et al. | 359/845 |
| 5,357,825 A | * | 10/1994 | Costello et al. | 310/311 |
| 5,557,477 A | * | 9/1996 | Sawicki | 359/846 |
| 5,777,807 A | | 7/1998 | Bar et al. | 359/845 |
| 6,021,153 A | * | 2/2000 | Okada | 372/107 |

FOREIGN PATENT DOCUMENTS

| | | | | |
|---|---|---|---|---|
| DE | 4138557 A1 | * | 5/1993 | ......... B23K/26/06 |
| DE | 4206792 A1 | * | 9/1993 | ......... B23K/26/06 |
| DE | 4308315 A1 | * | 9/1994 | ......... G02B/7/185 |
| DE | 686 032 A5 | | 12/1995 | |

* cited by examiner

Primary Examiner—Cassandra Spyrou
Assistant Examiner—John Juba, Jr.
(74) Attorney, Agent, or Firm—Scully, Scott, Murphy & Presser

(57) ABSTRACT

In the case of a deformable mirror (11) with a mirror plate (13) which is in glass form in particular for high laser frequencies and an axial actuator (20) which concentrically engages the rear side of the mirror surface (17)—with a reduced actuator stroke movement for the same dome-like configuration height—the dome configuration of the convex curvature of the mirror surface (17) is now of larger area and at the same time better approximated to the desirable sphere if, instead of the central application of force, the arrangement provides for decentral application of force at diametrally opposite locations. For that purpose the actuator (20) operates on a ring (25) which is disposed behind the mirror plate 13 and which is preferably integral with the mirror plate (13). If the application of pressure to the rear side of the mirror plate (13) is not along a circular ring but a ring (25) which is of elliptical cross-section, then astigmatism effects are reliably avoided even with large angles of beam incidence. Besides being influenced by way of the cross-sectional geometry of the ring (25), the sphere of the mirror surface (17) can also be influenced by way of a centrally symmetrical weakening or reduction in thickness of the mirror plate (13), and also by a static increased pressure in a fluid-filled chamber (26) behind the mirror plate (13). Heat losses which occur in the mirror plate (13) are dissipated by way of the fluid filling of the chamber (26) and the relatively flexurally stiff rear wall (29) thereof, which is a good conductor of heat, into a heat exchange chamber (30) disposed therebehind as a heat sink, of a volume which is variable in dependence on pressure, and carried away with the forced circulation of a cooling agent (31) flowing therethrough.

15 Claims, 1 Drawing Sheet

US 6,467,915 B2

DEFORMABLE MIRROR, IN PARTICULAR FOR A LASER BEAM MATERIAL MACHINING APPARATUS

BACKGROUND OF THE INVENTION

1. Field of the Invention

The invention relates to a deformable mirror, in particular a mirror which is utilized for a laser beam material machining apparatus.

2. Discussion of the Prior Art

A mirror of the general kind set forth is known from U.S. Pat. No. 5,777,807. Such mirrors have been successfully used for years in laser machining machines in order to be able to determine in the beam path directly downstream of the laser source the beam size or directly upstream of the optical focusing system the geometry and the spacing of the focal spot, and in that case to be able to compensate for influences of variable beam path lengths, as described in greater detail in CH 686 032 A5. If however an existing laser beam machining apparatus is to be only subsequently equipped with such a deformable mirror as a process-optimising optical system, then its rearward structural length which is governed by the linear actuator can project into the path of displacement of the handling devices for the workpieces, which causes trouble. Having regard to the fact that in practice operation is increasingly being implemented with laser beams of larger diameters, it would also be desirable not only to provide that the reflective mirror plate surface is bulged out convexly in an approximately spherical cap-like configuration in the relatively close area around the central point of application of axial force to the centre of the mirror plate, but also to achieve deformation which approximates as closely as possible to a sphere over a surface area which is as large as possible in the area around the centre point of the mirror plate.

Those aspects give rise to the present technical problem of so developing the deformable mirror of the general kind set forth, which in itself is tried and tested, in such a way that on the one hand a lower structural height is required for a predetermined stroke movement and on the other hand better spherically convex deformation is achieved with that stroke movement over even a relatively large mirror surface.

SUMMARY OF THE INVENTION

In accordance with the invention that object is attained by the aspect of the invention wherein the actuator is supported against the rear side of the mirror plate at mutually diametrally oppositely disposed positions which are displaced radially out of the longitudinal axis of the mirror.

In accordance therewith the translatorily acting actuator engages against the mirror plate at eccentric positions behind the mirror surface, said positions being in mutually diametrally opposite relationship with respect to the centre point of deformation. Because the edge of the mirror plate is held axially, that eccentric application of force—with respect to the central one—results in a lever effect which, with the same axial stroke movement, results in a greater degree of curvature with respect to the edge of the plate, that is to say in the central region of the mirror plate, than the same stroke movement which however is applied directly behind the centre of the mirror plate. This means that, with the conditions otherwise being the same, a smaller structural length of the actuator is sufficient for the same deflection movement of the centre of the plate. In addition, the fact that the edge of the mirror plate is held axially to act in opposite relationship to the stroke movement now provides, in cross-section, in an enlarged central area, that the mirror surface adopts a curved configuration which—compared to the central application of force—is less parabolic than as desired in the form of a circular arc, from the centre of the mirror surface to laterally far beyond the region of the eccentric application of force.

The succession of the eccentric points of engagement of the actuator behind the mirror plate can extend continuously or discretely graduated along a track, that is to say, it can be in the form of a sequence of mutually adjacent thin pivots or in the form of a peripherally extending ring. The track of those points of engagement and thus the geometry of the axial cross-section of the ring do not have to be circular. An oval cross-sectional geometry (transversely with respect to the system axis through the centre point of the mirror plate) results in orthogonally different radii of curvature and in that respect the radius ratio 1:2 has the great advantage that, even with an angle of incidence of about 45° for a 90° beam deflection and in spite of a round mirror plate the arrangement practically eliminates astigmatism as a consequence of unavoidable compensation of focal length errors.

BRIEF DESCRIPTION OF THE DRAWINGS

Additional alternatives and developments as well as further features and advantages of the invention will be apparent from the description hereinafter of a preferred embodiment of the invention, which is diagrammatically shown in greatly abstracted form in the drawing but not true to scale, being limited to what is essential. In the drawing.

DETAILED DESCRIPTION OF PREFERRED EMBODIMENTS

Figure 1:
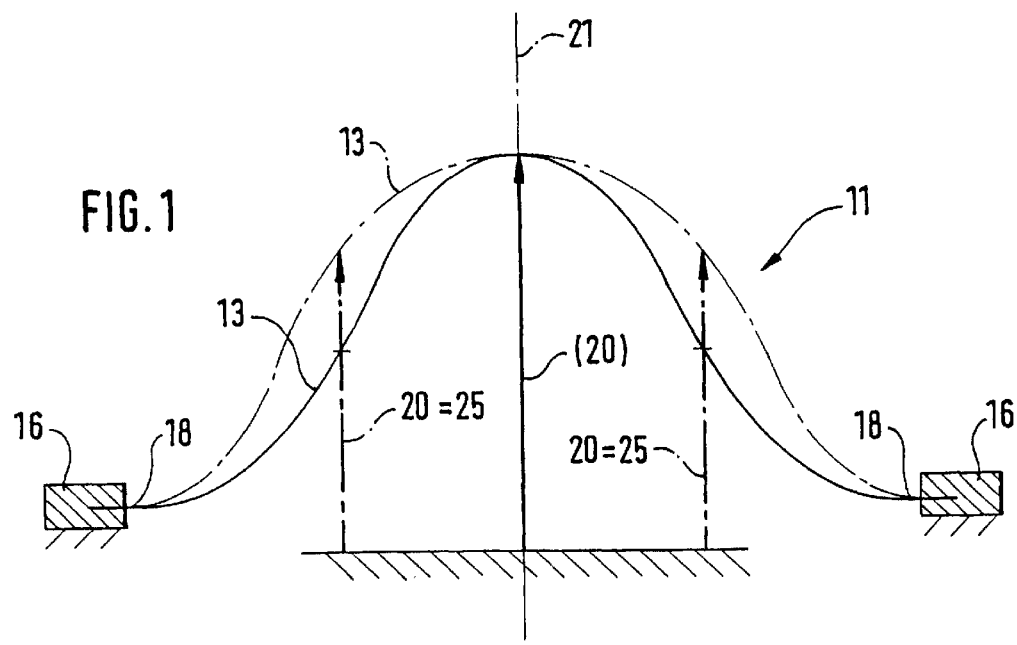
FIG. 1 shows the geometrical conditions involved in the transition from a central application of force to diametrally opposite decentral applications of force behind a mirror plate which is held axially fast along its edge.

The dash-dotted curve in FIG. 1 represents a cross-section through a flat hollow spherical configuration, wherein by virtue of a substantial increase in scale in respect of height with respect to the widthwise scaling, the physical circular shape in the central region has become an ellipse in the illustrated view.

The solid-line curve in FIG. 1 represents the convex bulge configuration of a mirror plate 13 which is axially held at the edge in mutually diametrally oppositely disposed regions, when force is applied centrally. That deformation which, in the case of a mirror plate 13 which is round and fixed therearound, is in the form of a circular arc (that is to say spherical in three dimensions) only in the apex region, has steeper flanks in relation to the ideal deformation curve (shown in dash-dotted line in FIG. 1).

If in contrast the application of force for causing the mirror plate 13 to bulge is displaced from the central axis 21 to mutually diametrally opposite sides, then over a wide region in the area around the centre that provides that the non-ideal deformation curve (shown in broken line) is increasingly matched or approximated to the ideal configuration of the sphere (in dash-dotted line at the centre in FIG. 1) to a position just before the axial holder 16 for the edge region 18 of the mirror plate 13. That approximation to the desired circular or spherical form, which is as ideal as possible, can therefore be influenced by the position of the diametral pair of engagement points behind the mirror plate 13 relative to the centre.

By virtue of the lever action about each actuator engagement point for applying the deflection force in axis-parallel relationship, as the respective lever pivot point, with the lever of a two-armed asymmetrical configuration as shown in FIG. 1 extending radially with respect to the preferably round mirror plate 13 from the edge 18 thereof beyond the engagement point to the centre of the plate on the axis 21, it will be seen from FIG. 1 that a substantially shorter adjusting stroke movement is required on the part of the actuator 20 (broken-line arrows in FIG. 1) for the same height of curvature in the centre of the plate, than when the force is applied centrally.

Figure 2:
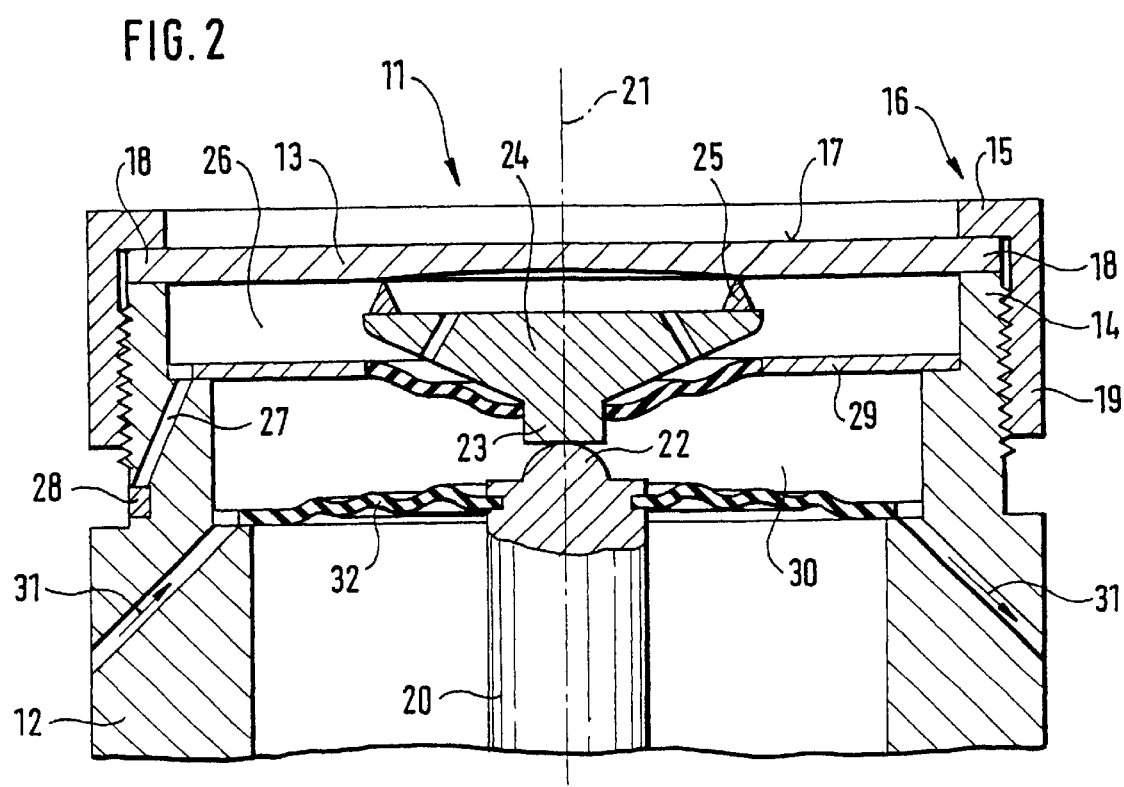
FIG. 2 shows a basic structural configuration in a broken-away view in axial longitudinal section for a mirror surface which is centrally deformed as a result of decentral application of force.

The operating principle diagrammatically illustrated in FIG. 1 is implemented by a mirror 11 as shown in FIG. 2. At its end, in front of its housing 12 which is substantially in the form of a thick-walled tube, the mirror 11 has a mirror plate 13 which is deformable to a greater or lesser degree in the axial direction from its rest position (in which it is planar or already curved). The mirror plate 13 is fixed to the housing 12 in an axial holder 16, along the edge 18 of the mirror plate 13, in front of the end 14 of the housing 12, said end of the housing being of annular cross-section.

The mirror plate 13 can be worked or cast from metal which reflects laser beams with the minimum possible losses, for example copper. It will be noted however that fine-structure brass as is described in German patent specification No 37 10 334 has a greater alternating stress or loading without permanent deformation in the area around the pressure-application regions of the plate 13. From certain points of view, discs or wafers which are cut from a single crystal such as silicon may be advantageous, if necessary welded in accordance with German laid-open application (DE-OS) No 38 09 921 from individual elements to form a mirror plate 13 of larger surface area. Preferably however the mirror plate is designed in the form of a composite plate of high-strength elastic carrier material based on copper, with a galvanically applied and diamond-milled copper layer as the mirror surface 17 because then inherent or internal stresses can be very substantially avoided. For the special case of particularly short-wave laser beams for example of neodynium-Yag lasers which are increasingly gaining in significance in the sector of material surface treatment, a polished glass mirror plate 13 is optimum because of its extremely smoothly surface 17.

The beam-side mirror surface 17 of the respective mirror plate 13 is generally planed after mechanical machining thereof and is made reflective by dielectric vapour deposition and is possibly coated in frequency-selective fashion.

Opposite the centre, the mirror plate 13 rests with its lateral edge 18 which generally extends peripherally in a circular configuration, on the geometrically correspondingly annular end 14 of the housing 12. For the axial holder 16, a shoulder 15 of a cap nut 19, which shoulder extends peripherally in flange-like configuration radially inwardly laterally engages over the edge 18 in axially opposite relationship to the end 14 of the housing. That axial holder 16 is stiff in the axial direction while the mirror plate 13 can work in a radial direction, for example due to a rise in temperature, in order to avoid radial upsetting, that is to say a bulging-out movement which is not to be attributed to an axial control stroke motion.

For controlled convex deformation of the mirror plate 13, supported coaxially therebehind against the rear side thereof is a linear actuator 20 which in turn is supported in opposite relationship on the housing 12. The actuator 20 is preferably an electromechanical piezoelectric column or pillar. Deflection thereof in the direction of the longitudinal axis 21 of the system is transmitted between a spherical cap portion 22 and a base portion 23 adjoining same, to a thrust member 24 which is of a conically radially enlarging configuration. The spherical contact of the cap portion 22 (which as diagrammatically illustrated is associated with the actuator 20 but which may also be structurally associated with thrust member 24) against a base portion 23 which is of a planar edge configuration in axially adjacent relationship provides that no tilting—that is to say unwanted asymmetrical deformation as a result of tilting movement of the mirror plate 13 out of the transverse position relative to the central axis 21—occurs even if that support should not be precisely on the central axis 21.

The thrust member 24 bears against the mirror plate 13 concentrically with respect to the edge holder 16, by way of a ring 25 which is in the form of pegs or projections (and which is therefore interrupted) or which extends in a continuous peripheral configuration, at the rear, that is to say in opposite relationship to the reflective mirror surface 17. Accordingly, the support action in respect of the mirror plate 13 is here eccentric with respect to the central axis 21, more specifically at each of two mutually diametrally oppositely disposed points of a discontinuous or infinitesimal sequence of points along the track of the annular support.

For that purpose the ring 25 can be arranged on the thrust member 24 or can be formed integrally with a funnel-shaped thrust member. Preferably the ring 25 bears with its knife edge-like face against the rear side of the mirror plate 13, as shown in the drawing with the triangular wall cross-section, in order for each stroke movement to afford the same geometrically defined application of force. It will be appreciated however that, due to the mode of operation involved, harmonisation faults which cannot always be avoided, that is to say displacement of the ring 25 out of its concentric relationship with the optical axis of the mirror plate 13, result in an asymmetry in regard to the curvature configuration of the mirror surface 17, thus giving rise to image defects or aberrations. In order to avoid this, it is more desirable for the ring 25 to be shaped or worked out concentrically on the rear side of the mirror plate 13, for example in the form of a bead or ridge which extends peripherally in the form of a circular ring. In that case, axial symmetry of the annular transmission of pressure to the mirror plate 13 can no longer be adversely affected by virtue of the fact that the actuator 20 or its pressure-transmitting thrust member 24 possibly slowly move out of the axis 21 of the mirror.

Lengthwise extension of the actuator 20 leads at any event in all diametral dimensions of the mirror plate 13 to a loading thereon, as shown by the broken-line arrows in FIG. 1, and thus results in the mirror surface 17 being caused to assume a curved configuration at its centre, in the form of a hollow spherical portion. This flat dome-like deformation in the further area around the centre of the mirror surface 17 is of a very good spherical configuration if the ring 25 is of a circular cross-section of a diameter of the order of magnitude of half the usable diameter of the mirror plate 13 itself. Besides being influenced by the radius of the ring 25, the dome shape can also be influenced by the thickness of the plate 13, in particular also by a material thickness which varies over the radius of the plate, as is also shown in the drawing for further clarification in this respect in axially exaggerated form by virtue of a reduced-thickness central region in the area around the central axis 21, in relation to the adjoining part to the edge 18 of the plate.

It is also possible to impart to the mirror surface 17 a permanent initial curvature on which the deformation effects produced by the actuator 20 are then superimposed. An axial biasing effect which is produced by the actuator 20 can be utilised to provide that initial curvature configuration, but instead or in addition it is also possible to provide for the action of the fluid cushion of a static increased pressure in a chamber 26 within and outside the ring 25, on the rear side of the mirror plate 13 which is remote from the mirror surface 17. The thrust member 24 at least partially passes in coaxial relationship through the pressure chamber 26 which is disposed directly behind the mirror plate 13. The pressure chamber 26 can be charged up with an in particular gaseous or liquid fluid by way of a filling passage 27 which is then hermetically sealed by means of a closure 28. The flexurally stiff rear wall 29 of the chamber 26, which is in opposite relationship to the mirror plate 13, is just so elastic that for example the central region of the rear wall 19 also goes with the movement of the thrust member 24 in the axial direction so that an outward bulging movement of the mirror plate 13, which is caused by way of the annular thrust member 24, does not have to work against a reduced pressure which would otherwise occur in the chamber 26.

The ridge-shaped ring 25 which is fitted to or which is integral with the thrust member 24 or preferably with the mirror plate 13 does not have to be of a circular shape. A ring which is elliptical in cross-section is particularly appropriate for the convex deformation of the mirror surface 17 which is then not spherical but ellipsoidal avoids astigmatism faults, even with large angles of beam incidence (as for 90° deflection of the laser beam), in spite of the mirror plate 17 being in the form of a circular disc or wafer, if the incoming and outgoing beams lie in the plane of the main axes of the elliptical ring 25.

In order to dissipate the waste heat absorbed by the mirror plate 13 by virtue of non-ideal reflection in the mirror surface 17, without entailing deformation as a result of a rise in temperature of the mirror plate 13 or a fluid filling behind same in the pressure chamber 26 and thus non-reproducible bulging of the mirror surface 17, which would be dependent on the operating time involved, disposed behind the rear wall 29 of the chamber, which comprises a material which is a good conductor of heat such as copper, aluminium or brass, is a heat exchange space or chamber 30 through which a cooling agent 31 positively flows. The metal base portion 23 of the thrust member 24, which is towards the actuator 20, is disposed in that flow of coolant and thereby promotes large-volume dissipation of heat from the pressure chamber 26 directly from the rear side of the mirror plate 13 by way of the thrust member 24.

Any fluctuations in pressure in the externally pumped forced flow of the cooling agent 31 through the heat exchange chamber 30 are not transmitted by way of the filling of the mirror chamber 26 to the plate 13 to produce deformation phenomena if a closure portion 32 which is disposed in opposite relationship to the rear wall 29 of the mirror chamber is of a rubber-elastic configuration, for example in the form of an annular disc diaphragm, being flexurally softer than the rear wall 29 of the mirror chamber which is flexurally stiff in relation thereto. For, in that case, fluctuations in pressure in the cooling agent 31 on flowing through the heat exchange chamber 30 primarily result in outward bulging movements of the flexurally soft closure portion 32, but practically not inward bulging movements of the rear wall 29 of the mirror chamber.

In the case of a deformable mirror 11 with an axial actuator 20 which concentrically engages the rear side of the mirror surface 17—with a reduced actuator stroke movement for the same dome-like configuration height—the dome configuration of the convex curvature of the mirror surface 17 is now of larger area and at the same time better approximated to the desirable sphere if, instead of the central application of force, the arrangement provides for decentral application of force at diametrically opposite locations. For that purpose the actuator 20 operates on a mirror plate 13—which is preferably in glass form, in particular when high laser frequencies are involved—at the rear, against the ring 25 which supports the actuator 20, the ring preferably being in the form of a peripherally extending bead or ridge on the rear side of the mirror plate 13. If that ring 25 bears against the mirror plate 13 which is held therearound, not along a circular track but a track which is of elliptical cross-section, with a large diameter which is twice as large as its small diameter, then astigmatism effects are reliably avoided even with large angles of beam incidence. Besides being influenced by way of the cross-sectional geometry of the ring 25, the sphere of the mirror surface 17 can also be influenced by way of a centrally symmetrical weakening or reduction in thickness of the mirror plate 13, and also by a static increased pressure in a fluid-filled chamber 26 behind the mirror plate 13. Heat losses which occur in the mirror plate 13 are dissipated by way of the fluid filling of the chamber 26 and the relatively flexurally stiff rear wall 29 thereof, which is a good conductor of heat, into a heat exchange chamber 30 disposed therebehind as a heat sink, of a volume which is variable in dependence on pressure, and carried away with the forced circulation of a cooling agent 31 flowing therethrough.

What is claimed is:

1. A deformable mirror (11) for a laser beam material processing apparatus, comprising a translatory actuator (20) which is articulated clamped between a rear side of a mirror plate (13) and a mirror housing (12) supporting said mirror plate (13), said actuator (20) contracting the rear side of said mirror plate coaxially offset from a center axis (21) extending through said mirror housing (12) and mirror plate (13) so as to spherically curve an opposite front mirror surface (17) in dependence of an electrical actuation of said actuator (20), said actuator contracting the rear side of said mirror plate (13) through a planar base portion (23) and a spherical cap portion (22) which is supported thereon, wherein the rear side of said mirror plate (13) is supported by a holder (16) along the peripheral edge (18) of said mirror at an end (14) of said mirror housing (12) such that the mirror plate (13) is axially stiff but yieldable in a radial direction.

2. A mirror according to claim 1, wherein a ring member (25) is disposed to enable said actuator (20) to bear against the rear side of the mirror plate (13).

3. A mirror according to claim 2, wherein said ring member (25) possesses a selectively continuous or discontinuous circular cross-section.

4. A mirror according to claim 2, wherein said ring member (25) possesses a selectively continuous or discontinuous elliptical cross-section.

5. A mirror according to claim 2, wherein said ring member (25) is arranged within a pressure chamber (26) which is statically filled with fluid behind the mirror plate (13).

6. A mirror according to claim 5, wherein a thrust member (24) is disposed between the actuator (20) and the ring member (25) and is axially subjected to pressure said trust member, projects from the pressure chamber (26) into a heat exchange chamber (30) located rearwardly of the pressure chamber (26), and wherein the heat exchange chamber has a forced flow of a cooling agent (31) conducted therethrough.

7. A mirror according to claim 6, wherein said heat exchange chamber (30) is separated from said pressure chamber (26) behind the mirror plate (13) by a relatively flexurally stiff chamber rear wall (29) of a heat-conductive material, and oppositely thereof includes a flexurally soft closure wall (32).

8. A mirror according to claim 1, wherein the mirror plate (13) comprises a composite plate of a copper-based high strength elastic carrier material having a galvanically applied and diamond-milled copper layer forming the front mirror surface (17).

9. A mirror according to claim 1, wherein the mirror plate (13) comprises a unitarily formed single-crystal disc.

10. A mirror according to claim 1, wherein the mirror plate (13) comprises a composite single-crystal disc.

11. A mirror according to claim 1, wherein the mirror plate (13) comprises a glass disc.

12. A mirror according to claim 1, wherein said spherical cap portion (22) is axially supported against planar base portion (23) between a pressure-transmitting thrust member (24) and said actuator (20).

13. A mirror according to claim 1, wherein pressure is transmitted from the actuator (20) to the rear side of the mirror plate (13) through a ring member (25) which is interposed between the mirror plate (13) and a pressure-transmitting thrust member (24) located in front of the actuator (20).

14. A mirror according to claim 1, wherein pressure is transmitted from the actuator (20) to the rear side of the mirror plate (13) through a ring member (25) which is formed integrally with a thrust member (24) opening in a funnel-like configuration in front of the actuator (20).

15. A mirror according to claim 1, wherein pressure is transmitted from the actuator (20) of the mirror plate (13) through a ring member (25) at the rear side of the mirror plate (13) in the shape of peripherally extending narrow ridge.

* * * * *